(12) United States Patent
Horak

(10) Patent No.: US 12,743,222 B2
(45) Date of Patent: Sep. 22, 2026

(54) MEMORY HAVING AN INFORMATION DATA SET ENABLING A DEVICE CONNECTED TO THE MEMORY TO ACQUIRE INFORMATION ABOUT THE REMAINING MEMORY LIFESPAN, METHOD FOR INITIALIZING A MEMORY WITH AN INFORMATION DATA SET, AND DEVICE WITH INTERFACE FOR CONNECTION TO A MEMORY

(71) Applicant: Siemens Aktiengesellschaft, Munich (DE)

(72) Inventor: Thomas Horak, Kremmen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/507,272

(22) Filed: Nov. 13, 2023

(65) Prior Publication Data

US 2024/0160370 A1 May 16, 2024

(30) Foreign Application Priority Data

Nov. 10, 2022 (EP) .................................... 22206722

(51) Int. Cl.
*G06F 12/00* (2006.01)
*G06F 3/06* (2006.01)

(52) U.S. Cl.
CPC ............ *G06F 3/064* (2013.01); *G06F 3/0616* (2013.01); *G06F 3/0679* (2013.01)

(58) Field of Classification Search
CPC ...... G06F 3/064; G06F 3/0616; G06F 3/0679; G06F 9/4411; G11C 7/20; G11C 2029/4402; G11C 16/349; G11C 29/56
USPC .......................................................... 711/154
See application file for complete search history.

(56) References Cited

U.S. PATENT DOCUMENTS

2019/0189236 A1* 6/2019 Poliakov .................. G06N 3/04
2020/0204991 A1* 6/2020 Parry .................. G06F 11/3037
2021/0084175 A1* 3/2021 Hitaka ............... H04N 1/00061

FOREIGN PATENT DOCUMENTS

DE 102008061093 A1 6/2010

* cited by examiner

*Primary Examiner* — Mardochee Chery
(74) *Attorney, Agent, or Firm* — Laurence A. Greenberg; Werner H. Stemer; Ralph E. Locher

(57) ABSTRACT

A memory is provided an information data set to be stored in the memory. The information data set contains: information about the type of diagnostic data made available by the memory upon external request, information about the required request procedure for such external requests and evaluation information enabling an interpretation of the answer data supplied by the memory on request. The information data set enables a device connected to the memory to acquire information about the manner of operation and the properties of the memory. Thus, the device can determine the remaining operational lifespan of the memory and to anticipate when the memory needs to be replaced. The memory thus enables an automatic adaptation of the device software of a connected device even to such memory types which are not known to the device in terms of their manner of operation.

15 Claims, 3 Drawing Sheets

Memory
Memory Location
DD
BSZ
IBK(M), BI
HI
DB1
DB2
DB3
DB4
20
21
IDS
BSZ
IDS, DD
11
10
13
Device
Memory
ISM
Computing Unit
12

Device
Computing Unit
12
Memory
ISM
10
13
11
IDS, DD
ABK
Memory
20
Memory Location
21
IDS
DB1
DD
DB2
ABK
DB3
IBK(M), BI
DB4
HI Memory
Memory Location
DD
DB2
DB3
HI
DB1
DB4
20
21
IDS
Device
Memory
ISM
Computing Unit
12
10
13
HI
11

MEMORY HAVING AN INFORMATION DATA SET ENABLING A DEVICE CONNECTED TO THE MEMORY TO ACQUIRE INFORMATION ABOUT THE REMAINING MEMORY LIFESPAN, METHOD FOR INITIALIZING A MEMORY WITH AN INFORMATION DATA SET, AND DEVICE WITH INTERFACE FOR CONNECTION TO A MEMORY

CROSS-REFERENCE TO RELATED APPLICATION

This application claims the priority, under 35 U.S.C. § 119, of European Patent Application EP22206722.5, filed Nov. 10, 2022; the prior application is herewith incorporated by reference in its entirety.

FIELD AND BACKGROUND OF THE INVENTION

The invention relates to a memory suitable for connection to electrical devices. The memory can be for example a nonvolatile memory such as a flash memory, for example. Memories of this type are generally available in the form of SD memory cards.

The so-called NAND flash used on SD memory cards has a limited lifetime since it cannot be erased arbitrarily often. If SD cards are used as a technical component in devices for industrial applications with high requirements in respect of availability, there may be the need to obtain and evaluate information about the state of health of the SD card as diagnostic information. The aim is to diagnose an imminent failure of an SD card in a timely manner in order that the SD card threatened by the failure can be replaced in the course of planned maintenance.

SD cards intended for industrial applications therefore often afford the possibility of accessing diagnostic data provided by the manufacturer of the controller via the memory bus by means of the SD/MMC protocol. The manner in which these diagnostic data can be read out, and also the format and the contents of the diagnostic data are not standardized and are implemented in various ways by the manufacturers of the SD card controllers.

For each supported SD card type, therefore, it is generally necessary to effect an appropriately matching implementation in the driver software of the devices. If different SD card types are used, it is necessary to automatically recognize the type of inserted SD card in the device and execute the matching program routines for the diagnostics.

If new types of SD cards are intended to be introduced because the variants qualified for a device have been discontinued by their manufacturers, for example, it is necessary to adapt the device software for access to the diagnostic data of new SD card types. For the devices having a long lifetime in the field this would necessitate a software exchange whenever one of the new SD card types has to be used as a spare part for an older SD card threatened by the failure.

However, exchanging the device software may pose problems, for example:

- if there are a multiplicity of devices used—possibly worldwide—with software versions of different ages in heterogeneous system situations and resultant compatibility problems, and/or
- if the devices have no direct possibility for installing new software or have restricted access, and/or
- if the devices are used in safety-critical applications on customer installations, for example, and new software versions would initially have to be subjected to comprehensive additional and cost-intensive tests, and/or
- if customers do not want to install new device software for other reasons.

SUMMARY OF THE INVENTION

The invention is based on the object of specifying a memory which takes account of the above-described problem of compatibility with connected devices.

This object is achieved according to the invention by means of a memory having the features as claimed in independent memory claim. Advantageous configurations of the memory according to the invention are specified in dependent claims.

Accordingly, the invention provides for an information data set to be stored in the memory. The information data set contains: information about the type of diagnostic data made available by the memory upon external request, information about the required request procedure for such external requests and evaluation information enabling an interpretation of the answer data supplied by the memory on request.

A major advantage of the memory according to the invention can be seen in the fact that the information data set provided according to the invention enables a device connected to the memory to acquire information about the manner of operation and the properties of the memory in order then to be able to address the latter memory-specifically and to be able to read out diagnostic data relating to the memory from the memory.

It is advantageous if the evaluation information defines the data format, the data structure and/or the bit arrangement of the answer data.

Preferably, the memory makes available the erase cycle count, the number of reserve blocks still available and/or the remaining lifetime of the memory as diagnostic data.

Moreover, it is advantageous if the information about the required request procedure defines one or more bit sequences to which the memory reacts by outputting the diagnostic data.

Alternatively or additionally, the information data set can advantageously define a request command chain which a device that reads out the information data set can process in order to retrieve diagnostic data from the memory.

Preferably, the evaluation information of the information data set contains interpretation instructions regarding the interpretation of the diagnostic data read out. The instructions are preferably contained in the form of an interpretation algorithm or an instruction command chain in the information data set.

The interpretation instructions can advantageously additionally describe predefined measures which the device is intended to implement if the state of the memory reaches critical limits.

The information data set is preferably stored at a fixedly predefined memory location of the memory in order to enable the information data set to be read out without prior knowledge of the structure of the memory.

It is particularly advantageous if the information about the required request procedure, i.e. for example the request command chain, and the evaluation information, i.e. for example the instruction command chain, are stored in the information data set in each case as a copyable function block which the connected device can read out and implement in its interpretation software module for example by copying the respective function block. In this way, the adaptation of the interpretation software module to the individual memory can already be accomplished in the context of a simple copying step.

In the case of a memory without readability of diagnostic data, it is advantageous if the information data set contains auxiliary information which enables an auxiliary estimation of the lifetime of the memory without diagnostic data.

Moreover, it is advantageous if the information data set contains description information in human-interpretable text form enabling the diagnostic data supplied by the memory to be interpreted by an operator.

The memory is preferably a nonvolatile flash memory.

The invention furthermore relates to a method for initializing a memory, in particular a memory such as has been described above.

With regard to such an initialization method, the invention provides for an information data set to be stored in the memory. The information data set contains: information about the type of diagnostic data made available by the memory upon external request, information about the required request procedure for such external requests and evaluation information enabling an interpretation of the answer data supplied by the memory on request.

With regard to the advantages of the method according to the invention and the advantageous configurations thereof, reference should be made to the above explanations in connection with the memory according to the invention and the advantageous configurations thereof.

The invention additionally relates to a device having an interface for connection to a memory, in particular a memory such as has been described above. With regard to such a device, the invention provides that an interpretation software module is stored in the device and, upon execution by a computing unit of the device, causes the device to read out an information data set stored in a connected memory. The information data set contains information about the type of diagnostic data made available by the memory upon external request, information about the required request procedure for such external requests and evaluation information enabling an interpretation of the answer data supplied by the memory on request, and to evaluate the information data set at least with regard to the request procedure and the interpretation of the answer data.

With regard to the advantages of the device according to the invention and the advantageous configurations thereof, reference should be made to the above explanations in connection with the memory according to the invention and the advantageous configurations thereof.

A major advantage of the device according to the invention consists in the automated adaptation of the manner of operation of the device to the respective memory properties which is possible by virtue of the interpretation software module when it comes to reading out and interpreting diagnostic data from the memory or implementing measures memory-specifically if the memory reaches a critical state.

It is advantageous if the interpretation software module reads out bit sequences or a request command chain from the information data set and subsequently processes same in order to retrieve the diagnostic data from the memory.

Moreover, it is advantageous if the interpretation software module reads out interpretation instructions from the information data set and subsequently processes them in order to interpret the diagnostic data read out and to implement measures recommended on the part of the memory.

Preferably, the interpretation software module reads from a fixedly predefined memory location of the memory and continues to treat the data stored there as the information data set. Prior knowledge about the memory is advantageously not required in the case of this procedure.

It is particularly advantageous if the interpretation software module of the device reads out from the memory one or more function blocks containing the information about the required request procedure, i.e. for example the request command chain, and the evaluation information, i.e. for example the instruction command chain, and integrates same into a memory communication section of the interpretation software module for example by copying the function blocks. In this way, the adaptation of the interpretation software module to the individual memory can be accomplished in the context of a simple copying step.

When requested by the operator, preferably the device visually, haptically and/or acoustically outputs description information of the information data set. Moreover, preferably the device enables a remote retrieval of the description information.

The device is preferably a power engineering protection and/or observation device, in particular a control engineering device, a fault recorder or a unit for monitoring the network quality, for an electrical power supply system.

Other features which are considered as characteristic for the invention are set forth in the appended claims.

Although the invention is illustrated and described herein as embodied in a memory, a method for operating a memory, and a device with interface for connection to a memory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, the same reference signs are always used for identical or comparable components for the sake of clarity.

Figure 1:
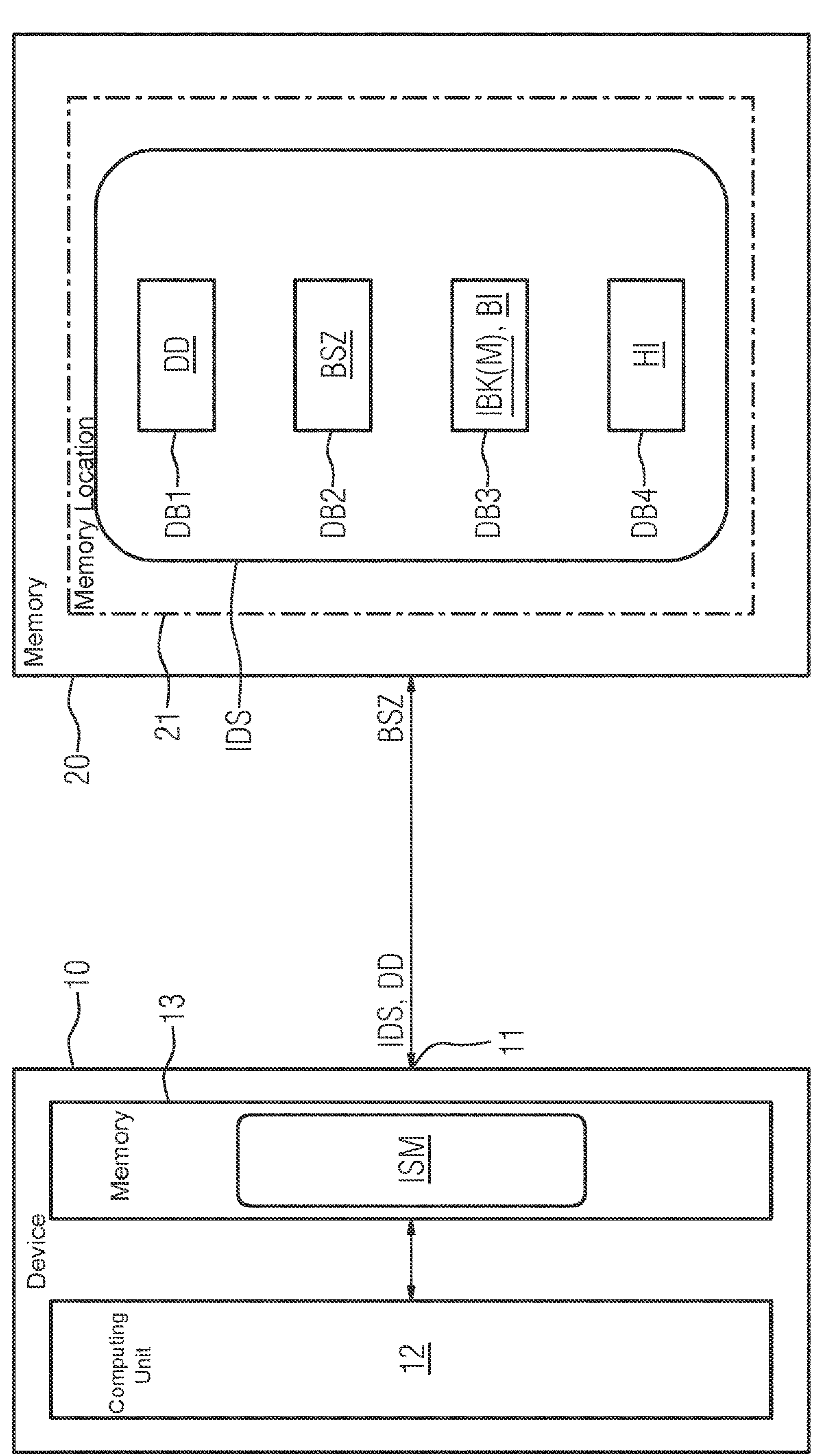
FIG. 1 is an illustration showing a first exemplary embodiment of an arrangement equipped with an exemplary embodiment of a device according to the invention and an exemplary embodiment of a memory connected to the device, wherein information about a required request procedure stored in the memory contains one or more bit sequences.

Referring now to the figures of the drawings in detail and first, particularly to FIG. 1 thereof, there is shown an exemplary embodiment of an arrangement containing a device 10 and a memory 20 connected to an interface 11 of the device 10.

The memory 20 is preferably a nonvolatile flash memory. The device 10 is preferably a power engineering protection and/or observation device, in particular a control engineering device, a fault recorder or a unit for monitoring the network quality, for an electrical power supply system.

An information data set IDS is stored in the memory 20, and the device 10 can read out and evaluate the information data set in order subsequently to be able to read out and evaluate diagnostic data DD, such as indications concerning the lifetime or the technical state of the memory 20, for example, from the memory 20. It is advantageous if the memory 20 makes available the erase cycle count, the number of reserve blocks still available and/or the remaining lifetime of the memory 20 as the diagnostic data DD. The information data set IDS is preferably stored at a fixedly predefined memory location 21 or memory section of the memory 20.

The information data set IDS in accordance with FIG. 1 contains a first data set area DB1 having information about the type of diagnostic data DD which the memory 20 can make available to the connected device 10 upon suitable external request.

Information about the required request procedure for suitable external requests by the device 10 is described in a second data set area DB2 of the information data set IDS in accordance with FIG. 1.

The information about the required request procedure stored in the second data set area DB2 of the information data set IDS can be configured in various ways.

For example, as shown in FIG. 1 by way of example, the information about the required request procedure can comprise one or more bit sequences BSZ to which the memory 20 reacts by outputting the diagnostic data DD. After receiving the information data set IDS, the device 10 can use these bit sequences BSZ autonomously in order to read out the diagnostic data DD from the memory 20.

Figure 2:
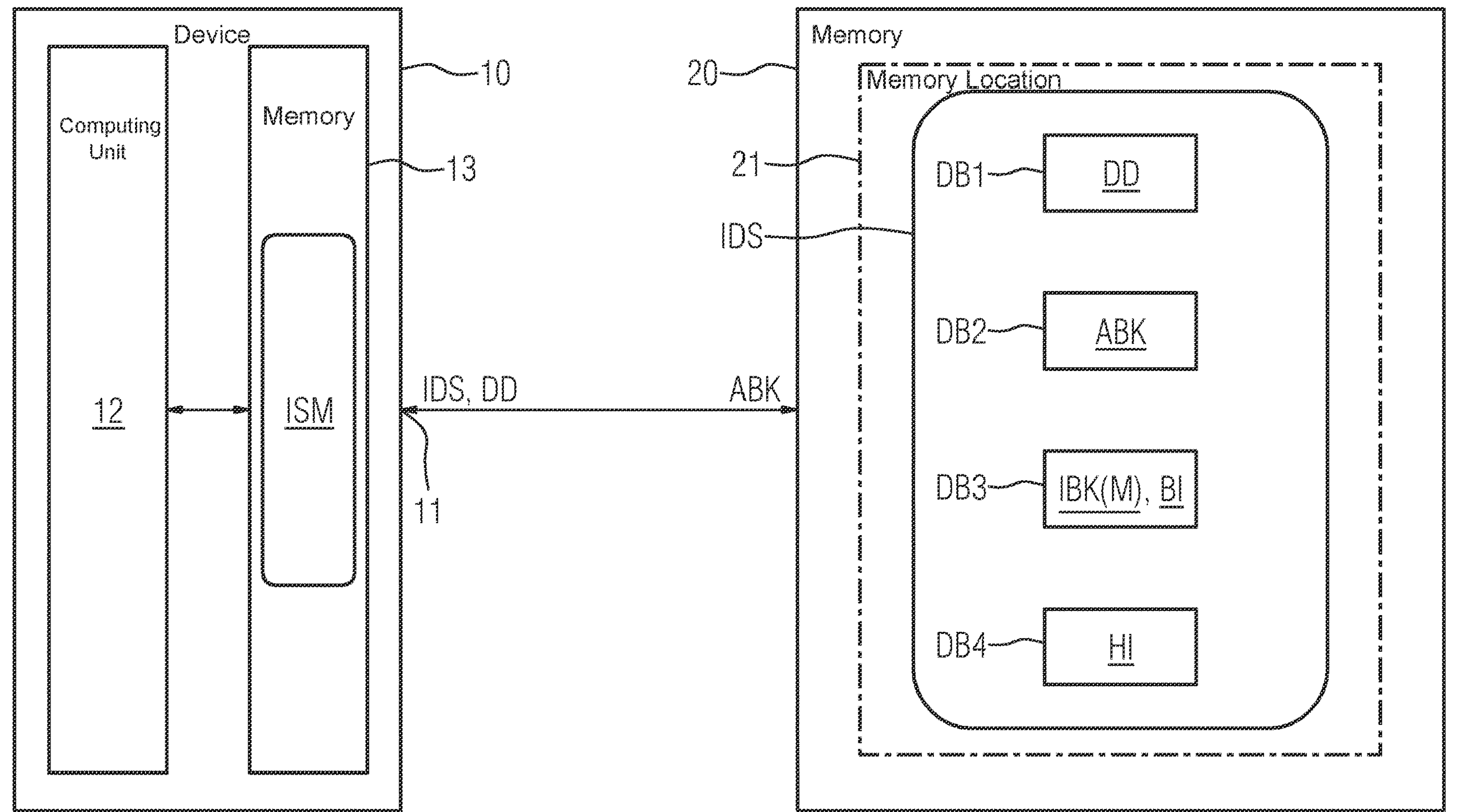
FIG. 2 is an illustration showing, as a second exemplary embodiment, an embodiment variant of the first exemplary embodiment in which information about the required request procedure defines a complete request command chain which an interpretation software module of the device can directly apply and directly process after the loading of the information data set.

Alternatively or additionally, the information about the required request procedure, as shown in FIG. 2 by way of example, can define a complete request command chain ABK which an interpretation software module ISM of the device 10 can directly apply or directly process after the loading of the information data set IDS, in order to retrieve the diagnostic data DD from the memory 20.

A third data set area DB3 of the information data set IDS contains evaluation information enabling an interpretation of the answer data supplied by the memory 20 on request.

The evaluation information stored in the third data set area DB3 of the information data set IDS preferably contains the data format, the data structure and/or the bit arrangement of the answer data output by the memory 20 and thus enables the device 10 to understand data coming from the memory 20.

By way of example, the evaluation information stored in the third data set area DB3 of the information data set IDS can contain specific interpretation instructions in the form of an interpretation algorithm or an interpretation command chain IBK which the interpretation software module ISM of the device 10 can directly execute in order to perform the interpretation of the diagnostic data DD read out.

The interpretation instructions (i.e. the interpretation algorithm or the interpretation command chain IBK) preferably additionally contain measures M recommended on the part of the memory which the device 10 should implement if the state of the memory 20 becomes critical or the memory 20 reaches its lifetime limit. Such measures comprise for example generating warning or alarm signals if the diagnostic data DD reach critical values or exceed or fall below threshold values.

It is particularly advantageous if the interpretation command chain IBK supplements or follows the request command chain ABK. In the case of such a configuration, the interpretation software module ISM can process first the request command chain ABK and subsequently the interpretation command chain IBK and can carry out, if appropriate, the measures M defined in the interpretation command chain IBK, such as, for example, generating warning, maintenance or alarm signals depending on the diagnostic data DD received.

The request command chain ABK and the instruction command chain IBK can each be stored as copyable function blocks which the connected device 10 can read out and implement in its interpretation software module ISM for example by copying the function blocks. In this way, the adaptation of the interpretation software module to the individual memory can already be accomplished in the context of a simple copying step.

By way of example, after the device 10 has read out from the memory 20 the diagnostic data DD, such as, for example, the number of spare memory blocks, the number of erase cycles and/or an endurance value describing the endurance (remaining lifetime), in the context of the measures M mentioned, the device can compare the values read out with predefined threshold values and, depending on the result of the comparison and the threshold values used, generate the warning or alarm signals mentioned.

The third data set area DB3 of the information data set IDS can furthermore contain description information BI in human-interpretable text form enabling the diagnostic data DD supplied by the memory 20 to be interpreted by an operator.

Figure 3:
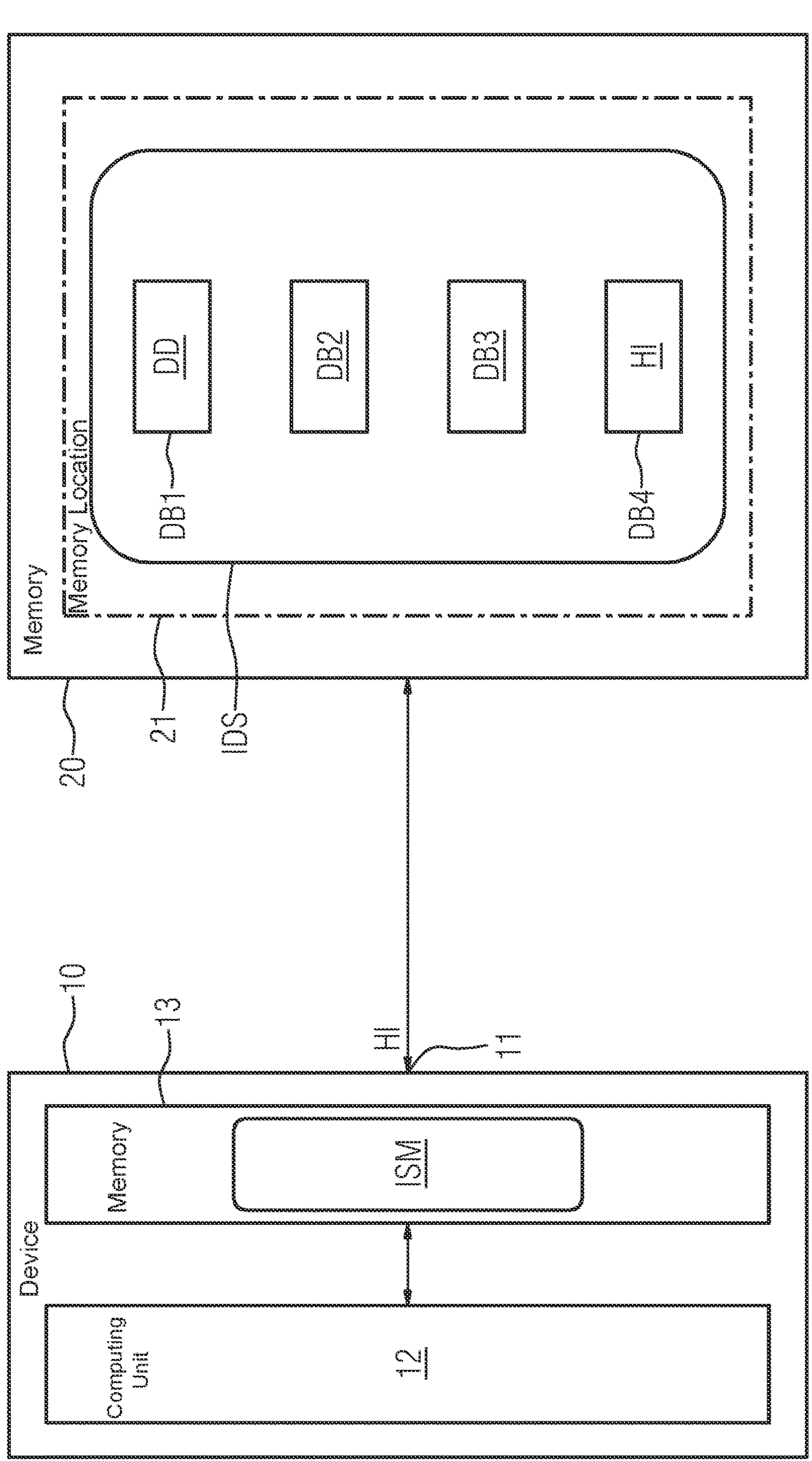
FIG. 3 is an illustration showing, as a third exemplary embodiment, an embodiment variant in which the memory, for technical reasons, does not enable diagnostic data to be read out but makes available auxiliary information enabling an auxiliary estimation of the lifetime of the memory.

If, for technical reasons, the memory 20 does not enable diagnostic data DD to be read out, as shown in FIG. 3 by way of example, auxiliary information HI is preferably stored in the information data set IDS, the auxiliary information enabling at least an auxiliary estimation of the lifetime of the memory 20. Such auxiliary information HI can comprise the date of manufacture of the memory 20, the manufacturing batch and/or the guaranteed minimum number of erase operations. The auxiliary information HI can be stored in a dedicated fourth data set area DB4 of the information data set IDS; in such a case, for example, the first data set area DB1 can indicate that no diagnostic data DD are available, and the second and third data set areas DB2 and DB3 can indicate that owing to the absence of diagnostic data DD, a request procedure and accordingly evaluation information in this regard are not available either.

The device 10 connected to the memory 20 in FIGS. 1 to 3 contains a computing unit 12 and a device-side memory unit 13, in which the interpretation software module ISM already mentioned is stored. Upon execution of the interpretation software module ISM by the computing unit 12, the computing unit 12 and thus the device 10 overall is enabled to read out and evaluate the information data set IDS from the memory 20 connected to the interface 11, subsequently to direct suitable diagnostic requests to the memory 20 and also to understand and interpret diagnostic data DD received as an answer to diagnostic requests. Alternatively, the device 10 can read out and evaluate auxiliary data HI possibly present—as shown in FIG. 3—if the memory 20 does not make diagnostic data DD available.

For the purpose of obtaining the information data set IDS, the interpretation software module ISM preferably reads from the fixedly predefined memory location 21 of the memory 20 and continues to treat the data stored there as the information data set IDS.

Description information BI contained in the third data set area DB3 of the information data set IDS, for example, is output for example visually on a screen or the like by the device 10 after reading out the information data set IDS. The device 10 preferably also enables a remote retrieval of both the diagnostic data DD and the description information BI of the information data set IDS.

For starting up the arrangement shown in FIGS. 1 to 3, the procedure adopted is now described as follows.

Firstly, the memory 20 is initialized by an information data set IDS that describes the memory 20 being stored at the memory location 21. Beforehand, at the same time or afterward, the interpretation software module ISM is installed in the device 10.

The memory 20 can subsequently be connected to the interface 11 of the device 10. After connection, the interpretation software module ISM can read out from the memory 20 one or more function blocks containing the information about the required request procedure, i.e. for example the request command chain ABK, and the evaluation information, i.e. for example the instruction command chain IBK, and can integrate same into a memory communication section of the interpretation software module ISM for example by copying the function blocks. In this way, the adaptation of the interpretation software module ISM to the individual memory 20 can be accomplished in the context of a simple copying step.

The information data set IDS and the interpretation software module ISM enable the device 10 regularly or irregularly to retrieve current status information about the state of the memory 20 if the memory 20 communicates diagnostic data DD, or to perform at least an auxiliary estimation of the status of the memory 20 on the basis of auxiliary information HI.

The exemplary embodiments explained in connection with FIGS. 1 to 3 can advantageously have the features and properties described below in very great detail by way of example. In this case, a NAND flash memory in the form of an SD card is taken as a basis below by way of example.

The interpretation software module ISM described above can estimate the remaining lifetime of the SD card in various ways, for example in accordance with:

1. Spare Memory Blocks ("Spare Blocks"):

As early as during production, NAND flash memories will generally have a few defective memory blocks. A pool of spare memory blocks is therefore defined, which the SD card controller can draw on in order to exchange defective memory blocks for functioning memory blocks during operation. A certain portion of these spare memory blocks is already used up in an early phase of the use of the NAND flash. Thereafter the number of spare memory blocks still available remains constant or decreases only slowly over the entire lifetime of the NAND flash. Toward the end of the lifetime, when initial failures of memory cells occur owing to wear resulting from the erase cycles, the pool of remaining spare memory blocks becomes smaller in ever more rapid succession. An imminent failure of the NAND flash can be deduced from this.

2. Erase Cycles ("Erase Count"):

For current 32-nm NAND flash memories, usually at least between 1000 and 100 000 erase cycles are guaranteed before a memory cell is no longer able to be erased without errors. The remaining lifetime can be estimated on the basis of a counter for the erase cycles. For this purpose, for the type of NAND flash used on the SD card, the maximum number of erase cycles should be known or become evident as a parameter from the diagnostic data DD.

3. Endurance:

If a value for the endurance is provided, it is usually a percentage value that counts down from 100% to 0% in the course of the lifetime of the flash.

In order to generate a failure warning when the remaining running time left is of sufficient length, checking the number of erase cycles (erase count) or—if available—the endurance indication (endurance) is better suited, while monitoring the spare memory blocks (spare blocks) recognizes a directly imminent failure and should be signaled as failure alarm. For the diagnostic information DD required for this purpose, what should be known is the position of this information in the diagnostic data block and the intended magnitude of the limit values of this information, which limit values need to be monitored. There are manufacturers that over and above that even specify an algorithm for calculating the remaining lifetime on the basis of the diagnostic information.

Hereinafter, examples of the formats of diagnostic information from various manufacturers ("Vendor 1" to "Vendor 4") are presented in an anonymized manner and mention is made of the command of the SD/MMC protocol that is ultimately used to read out the data structures. The diagnostic data that can be used for an estimation of the state of health of the corresponding SD cards are highlighted by underlining:

```
struct Vendor1__CMD56
{
Uint8 null;
Uint8 spareRate;
Uint8 rest[510];
};
struct Vendor2__ACMD13
{
Uint8 data[25];
Uint8 structVersion;
Uint16 numDefectBlocks;
Uint16 initSpareBlocksWorst;
Uint16 initSpareBlocksAll;
Uint8 remainingSpareBlocksWorst;
Uint8 remainingSpareBlocksAll;
Uint16 uncorrectableECC;
Uint32 correctableECC;
Uint16 wearLevelClassLowest;
Uint16 wearLevelClassHighest;
Uint16 wearLevelThreshold;
Uint8 numBlockErasesTotal[6];
Uint16 numFlashBlockUnits;
Uint16 endurance;
Uint32 powerOnCount;
Uint32 firmwareVersion;
};
struct Vendor3__CMD56
{
Uint8 uniqueID[16];
Uint8 busWidth;
Uint8 securedMode;
Uint8 speedClass;
Uint8 speedGradeUHS;
Uint32 protectedAreaSize;
Uint8 spareBlockCount;
Uint8 originalBadCount;
Uint8 RTBBCount;
Uint8 SpareUtilizationRate;
Uint8 SPORfailureCount;
Uint32 minEraseCount;
Uint32 maxEraseCount;
Uint32 totalEraseCount;
```

-continued

```
Uint32 averagedEraseCount;
};
struct Vendor4_CMD17
{
Uint8 signature[3];
Uint32 reserved1;
Uint8 FlashType;
Uint8[6] FlashID;
Uint32 FlashPEcycle;
Uint32 reserved2;
Uint16 initialBadBlockCount;
Uint16 laterBadVB;
Uint16 spareVBcount;
Uint8 ECCbytes;
Uint32 totalVBeraseCount;
Uint32 abnormalShutdownCount;
Uint32 powerCycleCount;
Uint16 reserved3;
Uint8 totalCEcount;
Uint8 VBmultiplier;
Uint32 totalVirtualBlocks;
};
```

In order to create the information data set IDS, preferably a data structure with the scheme described below (in computer-interpretable form), in the course of an authorization/production step, is filled with the data descriptions matching the corresponding type of SD card and is copied to the SD card into a reserved sector as the memory location 21 mentioned above:

```
struct // packet struct, little endianness
{
Uint32 authorizationID; // authorization ID, encrypted marker
const Uint8 magic[ ] // for internal use
= {0, 0, 0, 0};
Uint32 structChkSum; // checksum over the following structure elements
const Uint8 structVersion =
1; // structure version to define the used format
Uint32 warningFromXxGB; // to generate warning, if data written to SD
card are greater than this
// value (as fallback solution if diagnostic data are not available)
Uint8 sdCardNameLength;
char sdCardName[ ]; // SD card type name for diagnostic text page in
device
Uint8 numHealthDataDescs; // => bit 0 ... 6; bit 7: 1 = big-endian, 0 =
little-endian
struct
{
Uint8 numValues;
struct
{
unsigned index : 9; // index of value in answer buffer
unsigned type : 3; // 0 = signed, 1 = unsigned, 2 = byte array, 3 = text
string
unsigned dataLength : 4; // length of health value type in bytes
Uint8 nameLength;
char name[ ]; // symbolic name of value, for diagnostic page
} values[ ];
} healthDataDescs[ ]; // one description for every used SD command,
max. 4
Uint8 numWritePatterns; // 0 => no patterns for sector writes defined
struct
{
Uint16 patternLength;
Uint8 pattern[ ]; // compressed
} writePatterns[ ];
Uint16 programCodeLength; // length of the following program code
Uint8 programCode[ ]; // byte array containing the program code for
health state calculation
} diagnosticDataDescriptionBlock;
```

This exemplary generic structure can be used to describe all manufacturer-specific diagnostic data DD presented as an example in the previous section and all further data formats that are conceivable in this context—including the parameter names as text. Storing the parameter names as text makes it possible to generate readable text pages for the service engineer from the diagnostic information of the SD card in the device 10.

The actual estimation of the health or the remaining lifetime of the SD card takes place within the program code that is part of the data description preferably as a byte array "program Code" (see the last part of the generic structure above).

An exemplary implementation on which these explanations are based has shown that the size of an individual sector of 512 bytes is sufficient for storing this description block. The restriction to an individual sector is not mandatory, however.

Regarding the interpretation software module ISM, it is advantageous if use is made of a programming language which can be processed interpretively and which, in a manner tailored to this application, manages with a few bytes of program code and, in contrast to directly loadable machine codes, does not offer a gateway for malware. Such an embodiment of the interpretation software module ISM can have the following form, for example:

a) A program instruction consists of an 8-bit instruction code, optionally followed by one or more argument bytes;

b) Arithmetic and logic instructions always aim for assignment into one of the 8 available registers R0 . . . R7;

c) Each of these registers can store a signed 64-bit integer value; and d) Constant integer values, registers and values from diagnostic data blocks are possible as source of register assignments. Write patterns, jump destinations (offsets) and texts can additionally be defined.

Source Arguments:

a. Constant Integer Value:

Bits 7 . . . 6: 00

Bit 5: 0=unsigned, 1=signed

Bits 4 . . . 0: Number of subsequent value bytes: 1=8-bit, 2=16-bit, 4=32-bit, 8=64-bit; +1, 2, 4 or 8 value bytes (little endian format); 64-bit values are always signed Example: 0x24, 0x79, 0x29, 0xed, 0xff→stands for: −1234567 b. Register Value:

Bits 7 . . . 6: 01

Bits 5 . . . 3: 000 (unused)

Bits 2 . . . 0: Source register 0 . . . 7

Example: 0x44→stands for: R4 c. Diagnostic Data Value:

Bits 7 . . . 6: 10

Bits 5 . . . 4: Index of the diagnostic data description (4 different diagnostic data blocks are addressable)

Bits 3 . . . 0: Index of the value within the diagnostic data description (only the first 16 values are addressable)

Example: 0xa8→diagnosticdatablock[2].value[8]→source text statement: D[2].V[8]

Further Argument Types:

a. Pattern Index: Uint8

Example: 0x02→writePatterns[2]→source text statement: P[2]

b. Offset: Uint8

An offset describes the jump in the program processing to a new position in the program code. A jump destination is marked by a jump mark in the source code. Example on the basis of the GOTO instruction:

GOTO newPosition

NewPosition:

A jump mark must be followed by a program instruction on the same line in the source text.

c. Text:

First byte: Number of subsequent text characters

Subsequent bytes: ASCII text characters

Example: 0x03 0x41 0x42 0x43→source text statement: "ABC"

a) Macro definitions with '#define' and comments, marked and beginning with 'II', are allowed in the source text.

The following exemplary program (represented as a sequence of hexadecimal values) loads for example a diagnostic data block by means of the ACMD13 command and checks the number of spare memory blocks (spare blocks), which in this example are in the value no. 6:

[@00] 60 // Read health data with ACMD13 to description buffer 0

Table with examples of possible instruction codes:

| Instruction | Code | Argument(s) | Description |
|---|---|---|---|
| ASSIGN_R0 . . . _R7 | 0x00 . . . 0x07 | [src.arg.] | Assignment of a source argument to a register |
| ADD_R0 . . . _R7 | 0x08 . . . 0x0f | [src.arg.] | Rx := Rx + value |
| SUB_R0 . . . _R7 | 0x10 . . . 0x17 | [src.arg.] | Rx := Rx − value |
| MUL_R0 . . . _R7 | 0x18 . . . 0x1f | [src.arg.] | Rx := Rx * value |
| DIV_R0 . . . _R7 | 0x20 . . . 0x27 | [src.arg.] | Rx := Rx/value |
| AND_R0 . . . _R7 | 0x28 . . . 0x2f | [src.arg.] | Rx := Rx & value |
| OR_R0 . . . _R7 | 0x30 . . . 0x37 | [src.arg.] | Rx := Rx \| value |
| XOR_R0 . . . _R7 | 0x38 . . . 0x3f | [src.arg.] | Rx := Rx % value |
| NEG_R0 . . . _R7 | 0x40 . . . 0x47 | — | Rx := ~Rx |
| GT_R0 . . . _R7 | 0x48 . . . 0x4f | [src.arg.] [offset/Uint8] | IF Rx > value GOTO offset |
| LT_R0 . . . _R7 | 0x50 . . . 0x57 | [src.arg.] [offset/Uint8] | IF Rx < value GOTO offset |
| EQ_R0 . . . _R7 | 0x58 . . . 0x5f | [src.arg.] [offset/Uint8] | IF Rx == value GOTO offset |
| ACMD13_D0 . . . _D3 | 0x60 . . . 0x63 | — | Execute the ACMD13 command and store the received data in the diagnostic data block 0 . . . 3 |
| CMD56_D0 . . . _D3 | 0x64 . . . 0x67 | [src.arg.] | Execute the CMD56 command with the given 32-bit argument and store the received data in the diagnostic data block 0 . . . 3 |
| WRITE_CMD56 | 0x68 | [pattern idx./ Uint8] [src.arg.] | Write the bit pattern with the CMD56 command and the given 32-bit argument |
| WRITE_SEC | 0x69 | [pattern idx./ Uint8] [src.arg.] | Write the bit pattern to the given sector address |
| READ_SEC_D0 . . . _D3 | 0x6a . . . 0x6d | [src.arg.] | Read a sector and store the received data in the diagnostic data block 0 . . . 3 |
| RAISE_ALARM | 0x6e | — | Raise an alarm (end of life of the SD card reached) |
| RAISE_WARNING | 0x6f | — | Raise a warning provided that a (higher-priority) alarm has not yet been raised (end of life of the SD card soon reached) |
| SET_OK | 0x70 | — | Set the status for the SD card to okay provided that neither a warning nor an alarm has been raised |
| GOTO | 0x71 | [offset/Uint8] | Continue the program processing at the new program position |
| END | 0x72 | — | End the program execution |
| CALLERROR | 0x73 | [text string] | Report an error text to the diagnostic system of the device |
| DELAY | 0x74 | [src.arg.] | Stop the program execution for the given waiting time in microseconds |
| WRITE_SEC_D0 . . . _D3 | 0x75 . . . 0x78 | [src.arg.] | Write one of the diagnostic data blocks back to the SD card at the given destination address |

```
[@01] 00 86 // Register R0:=healthDataDescs[0].values
    [6=spareBlockCount]
[@03] 48 01 05 09 // if R0>5 go to offset 0x09
[@07] 6e // Raise ALARM
[@08] 72 // End
[@09] 48 01 0a 0f // if R0>10 go to offset 0x0f
[@0d] 6f // Raise WARNING
[@0e] 72 // End
[@0f] 70 // Set OK
```

The reference implementation preferably uses a compiler tool with which firstly the descriptions of the diagnostic blocks and also the program code can be developed in a text-based manner in a pseudolanguage with better readability and can be transferred into a binary data block.

A program code example in text form for a different type of SD card may be manifested as follows, for example:

```
ASSIGN_R1 0 // loop counter R1=0
WRITE_SEC P[0] 0 // write entry pattern[0] to sector 0
ReadAgain: ADD_R1 1 // increment loop counter
GT_R1 10 Error // after 10 loops without
    success==>report error!
READ_SEC_D0 0 // read health data from sector 0 to
    healthDataDescs[0]
ASSIGN_R0 D[0].V[12]// R0=SMARTdataReady
EQ_R0 1 ReadAgain // smart data ready?
ASSIGN_R0 D[0].V[5]// spareVBcount
GT_R0 1 WarningCheck1 // virtual spare block coun-
    ter==1 or 0- ->ALARM!
RAISE_ALARM // ALARM!
GOTO Leave
WarningCheck1: GT_R0 2 LifePercent // virtual spare
    block counter==2- -
WARNING!
RAISE_WARNING // WARNING (interim result)
Life Percent: ASSIGN_R0 D[0].V[7]// totalVBerases
MUL_R0 100
ASSIGN_R2 D[0].V[15]// totalVirtBlocks
DIV_R0 R2 // AverageEraseCount=TotalVBEraseCount/
    TotalVirtualBlocks
ASSIGN_R2 D[0].V[2]// flashPEcycles
DIV_R0 R2 // LifeMonPercentage=(AveragedErase-
    Count*100)/
FlashPECycle
LT_R0 96 WarningCheck2 // lifetime>95%- ->ALARM!
RAISE_ALARM // ALARM!
GOTO Leave
WarningCheck2: LT_R0 91 SetOK // lifetime>90%- ->
    WARNING!
RAISE_WARNING // WARNING!
GOTO Leave
SetOK: SET OK // SD card health OK
GOTO Leave
Error: CALLERROR "Health data cannot be retrieved in
    time"
Leave: WRITE_SEC P[1] 0 // write leave pattern[1] to
    sector 0
END // only for readability; END not necessary here
```

The following example shows a resulting binary block which can be written to the SD card as an information data set IDS in the context of an authorization/production step and contains all the necessary description data (including the texts for the representation on the diagnostic pages of the device) and the byte code for calculating the health status of the SD card:

```
/*@000*/ 0x11, 0x22, 0x33, 0x44, // UInt32 authorization
    ID (example)
/*@004*/ 0x00, 0x00, 0x00, 0x00, // Byte[ ] magic
/*@008*/ 0x0b, 0x8e, 0x84, 0xb3, // UInt32
    structChkSum=1410387331
/*@012*/ 0x01, // Byte structVersion=1
/*@013*/ 0xb0, 0x68, 0x05, 0x00, // UInt32 warning-
    FromXxGB=3011808779
/*@017*/ 0x0d, // Byte sdCardNameLength=13
/*@018*/ 0x49, 0x4e, 0x4e, 0x4f, 0x44, 0x49, 0x53,
    0x4b, 0x20, 0x47, 0x65, 0x6e, 0x32, // SD card type
    name, e. g. "INNODISK Gen2"
/*@031*/ 0x82, // Byte numHealthDataDescs=2, big
    endian
// - - - ACMD13 . . . - - - - - -
/*@032*/ 0x08, // Byte numValues=8
/*@033*/ 0xb3, 0x0c, // Byte nameLength=3251
/*@035*/ 0x09, // Byte nameLength=9
/*@036*/ 0x73, 0x69, 0x67, 0x6e, 0x61, 0x74, 0x75,
    0x72, 0x65, // "signature"
/*@045*/ 0x14, 0x0e, // Byte nameLength=3604
/*@047*/ 0x0d, // Byte nameLength=13
/*@048*/ 0x6d, 0x69, 0x6e, 0x45, 0x72, 0x61, 0x73,
    0x65, 0x43, 0x6f, 0x75, 0x6e, 0x74, // "minErase-
    Count"
/*@061*/ 0x14, 0x10, // Byte nameLength=4116
/*@063*/ 0x0d, // Byte nameLength=13
/*@064*/ 0x6d, 0x61, 0x78, 0x45, 0x72, 0x61, 0x73,
    0x65, 0x43, 0x6f, 0x75, 0x6e, 0x74, // "maxErase-
    Count"
/*@077*/ 0x14, 0x16, // Byte nameLength=5652
/*@079*/ 0x0f, // Byte nameLength=15
/*@080*/ 0x74, 0x6f, 0x74, 0x61, 0x6c, 0x45, 0x72,
    0x61, 0x73, 0x65, 0x43, 0x6f, 0x75, 0x6e, 0x74, //
    "totalEraseCount"
/*@095*/ 0x12, 0x18, // Byte nameLength=6162
/*@097*/ 0x12, // Byte nameLength=18
/*@098*/ 0x61, 0x76, 0x65, 0x72, 0x61, 0x67, 0x65,
    0x64, 0x45, 0x72, 0x61, 0x73, 0x65, 0x43, 0x6f, 0x75,
    // "averagedEraseCount"
/*@114*/ 0x6e, 0x74,
/*@116*/ 0x12, 0x19, // Byte nameLength=6418
/*@118*/ 0x0d, // Byte nameLength=13
/*@119*/ 0x62, 0x61, 0x64, 0x42, 0x6c, 0x6f, 0x63,
    0x6b, 0x43, 0x6f, 0x75, 0x6e, 0x74, // "badBlock-
    Count"
/*@132*/ 0x11, 0x1a, // Byte nameLength=6673
/*@134*/ 0x0f, // Byte nameLength=15
/*@135*/ 0x73, 0x70, 0x61, 0x72, 0x65, 0x42, 0x6c,
    0x6f, 0x63, 0x6b, 0x43, 0x6f, 0x75, 0x6e, 0x74, //
    "spareBlockCount"
/*@150*/ 0x26, 0x1b, // Byte nameLength=6950
/*@152*/ 0x0b, // Byte nameLength=11
/*@153*/ 0x4e, 0x41, 0x4e, 0x44, 0x46, 0x6c, 0x61,
    0x73, 0x68, 0x49, 0x64, // "NANDFlashId"
// - - - CMD56 . . . - - - - - -
/*@164*/ 0x08, // Byte numValues=8
/*@165*/ 0x32, 0x00, // Byte nameLength=50
/*@167*/ 0x08, // Byte nameLength=8
/*@168*/ 0x75, 0x6e, 0x69, 0x71, 0x75, 0x65, 0x49,
    0x44, // "uniqueID"
/*@176*/ 0x11, 0x0c, // Byte nameLength=3089
/*@178*/ 0x12, // Byte nameLength=18
/*@179*/ 0x73, 0x70, 0x61, 0x72, 0x65, 0x42, 0x6c,
    0x6f, 0x63, 0x6b, 0x73, 0x49, 0x6e, 0x69, 0x74, 0x69,
    // "spareBlocksInitial"
/*@195*/ 0x61, 0x6c,
/*@197*/ 0x14, 0x0e, // Byte nameLength=3604
/*@199*/ 0x10, // Byte nameLength=16
```

```
/*@200*/ 0x53, 0x50, 0x4f, 0x52, 0x46, 0x61, 0x69,
    0x6c, 0x75, 0x72, 0x65, 0x43, 0x6f, 0x75, 0x6e, 0x74,
    // "SPORFailureCount"
/*@216*/ 0x14, 0x10, // Byte nameLength=4116
/*@218*/ 0x0d, // Byte nameLength=13
/*@219*/ 0x6d, 0x69, 0x6e, 0x45, 0x72, 0x61, 0x73,
    0x65, 0x43, 0x6f, 0x75, 0x6e, 0x74, // "minErase-
    Count"
/*@232*/ 0x14, 0x12, // Byte nameLength=4628
/*@234*/ 0x0d, // Byte nameLength=13
/*@235*/ 0x6d, 0x61, 0x78, 0x45, 0x72, 0x61, 0x73,
    0x65, 0x43, 0x6f, 0x75, 0x6e, 0x74, // "maxErase-
    Count"
/*@248*/ 0x14, 0x14, // Byte nameLength=5140
/*@250*/ 0x0f, // Byte nameLength=15
/*@251*/ 0x74, 0x6f, 0x74, 0x61, 0x6c, 0x45, 0x72,
    0x61, 0x73, 0x65, 0x43, 0x6f, 0x75, 0x6e, 0x74, //
    "totalEraseCount"
/*@266*/ 0x14, 0x16, // Byte nameLength=5652
/*@268*/ 0x0d, // Byte nameLength=13
/*@269*/ 0x61, 0x76, 0x67, 0x45, 0x72, 0x61, 0x73,
    0x65, 0x43, 0x6f, 0x75, 0x6e, 0x74, // "avgErase-
    Count"
/*@282*/ 0xbf, 0x1a, // Byte nameLength=6847
/*@284*/ 0x0c, // Byte nameLength=12
/*@285*/ 0x49, 0x53, 0x50, 0x46, 0x57, 0x56, 0x65,
    0x72, 0x73, 0x69, 0x6f, 0x6e, // "ISPFWVersion"
/*@297*/ 0x00, // Byte numWritePatterns=0
/*@298*/ 0x25, 0x00, // UInt16 programCodeLength=37
// - - - Byte[ ] programCode - - - - - -
/*@300*/ 0x60, 0x65, 0x04, 0xfd, 0x05, 0x00, 0x11,
    0x00, 0x86, 0x48, 0x01, 0x05, 0x0f, 0x6e, 0x72, 0x48,
/*@316*/ 0x01, 0x0a, 0x14, 0x6f, 0x00, 0x82, 0x50,
    0x02, 0xa8, 0xde, 0x1d, 0x6e, 0x72, 0x50, 0x02, 0xf0,
/*@332*/ 0xd2, 0x24, 0x6f, 0x72, 0x70,
// - - - random fill bytes - - - - - -
/*@337*/ 0x22, 0x58, 0xd6, 0x5e, 0xa1, 0x7f, 0x8d,
    0x3d, 0x3a, 0x39, 0xe1, 0xe1, 0xcf, 0xc9, 0x14, 0xaf,
/*@353*/ 0x19, 0x8f, 0xdc, 0x1f, 0xf0, 0xfd, 0xd8, 0x74,
    0x59, 0xbf, 0xad, 0xba, 0x73, 0x8c, 0x72, 0x84,
/*@369*/ 0x78, 0xe2, 0xc9, 0x1a, 0xd5, 0xd1, 0xa5,
    0x38, 0xb5, 0x26, 0x1e, 0x8e, 0x82, 0x1a, 0xb9, 0x60,
/*@385*/ 0x69, 0x82, 0x26, 0xe1, 0x36, 0x21, 0xc3,
    0x24, 0x7f, 0x62, 0x05, 0xe2, 0xd1, 0xd2, 0xc9, 0xae,
/*@401*/ 0xc7, 0x5d, 0x69, 0xec, 0x00, 0xf9, 0xd9,
    0x47, 0xea, 0xa4, 0x6a, 0xca, 0xdf, 0x4a, 0xf1, 0x3e,
/*@417*/ 0x06, 0x4c, 0x50, 0xf1, 0x65, 0x91, 0x4e,
    0x56, 0x1f, 0xa4, 0x9b, 0x73, 0xcc, 0xc3, 0x66, 0xe2,
/*@433*/ 0x5d, 0x6f, 0xc7, 0x25, 0xb1, 0xcc, 0x60,
    0x70, 0xa8, 0xde, 0xf7, 0x91, 0xb7, 0xf8, 0x45, 0x35,
/*@449*/ 0x70, 0xc6, 0xdb, 0x85, 0x82, 0xd8, 0x49,
    0x35, 0x0e, 0x13, 0xcd, 0x5b, 0x5e, 0x66, 0x7b, 0x26,
/*@465*/ 0x3e, 0x87, 0x6c, 0x70, 0x83, 0xcc, 0x8d,
    0x39, 0xeb, 0xe0, 0x48, 0x86, 0x9a, 0xbc, 0x9e, 0x26,
/*@481*/ 0x5f, 0x66, 0x02, 0x05, 0xe7, 0xe1, 0x60,
    0x84, 0x26, 0x91, 0x16, 0x9e, 0xff, 0x05, 0x11, 0x42,
/*@497*/ 0x63, 0xd0, 0x53, 0x2f, 0x8c, 0xd4, 0xb1,
    0xa4, 0x39, 0xa1, 0x99, 0xa1, 0x8f, 0xc2, 0x9b
```

In order that this description block can be processed by the device 10, in the interpretation software module ISM there is preferably implemented an interpreter as a subroutine which can read in the data descriptions as a sector from the SD card and can execute the program code.

In contrast to directly executable machine code, program code to be interpreted, as has been described here, with its restrictions to diagnostic data, does not constitute a gateway for malware.

In summary, the exemplary embodiments of the invention described above solve the problem of a use of "unknown new memories" in "old" legacy devices by virtue of the fact that on the memories (e.g. SD cards) generic information is stored in one or more unused sectors that are at defined sector addresses, the generic information describing the access to the required diagnostic information, including an algorithm that is executed interpretively in order to be able to calculate the remaining lifetime and thus the current state of health of the SD card.

In other words, if for example one type of SD card which is used in a device is no longer available, the device can be equipped with a new type of SD card from any other manufacturer, without access to the manufacturer-specific diagnostic data necessitating adaptation of the device software and installation thereof in the devices that are in use in the field. Even for types of SD card which were not known at the time of implementation of the device software, an estimation of lifetime and warnings and alarms derived therefrom can thus be effected by way of the generic method described.

The generic methods described above take account of the fact that the manufacturer of a type of SD card may make stipulations concerning the algorithm that can be used to calculate the remaining lifetime on the basis of the diagnostic data provided.

The methods described above are distinguished by the fact that they can be designed such that they cannot be misused as a gateway for malicious code.

Finally, it should be mentioned that the features of all the exemplary embodiments described above can be combined among one another in any desired way in order to form further other exemplary embodiments of the invention.

Moreover, all the features of dependent claims can be combined in each case by themselves with any of the alternative independent claims, specifically in each case on their own or in any desired combination with one or more other dependent claims in order to obtain further other exemplary embodiments.

The invention claimed is:

1. A memory, comprising:

an information data set stored in the memory, said information data set containing:

information about a type of diagnostic data made available by the memory upon external request, the external request allowing an external device access to the diagnostic data;

information about a required request procedure for such external requests, wherein the information about the required request procedure defines at least one bit sequence output by the memory to which the memory reacts by outputting the diagnostic data, and/or defines a request command chain which a device that reads out the information data set can process in order to retrieve the diagnostic data from the memory; and evaluation information enabling an interpretation of answer data supplied by the memory on request.

2. The memory according to claim 1, wherein the evaluation information defines a data format, a data structure and/or a bit arrangement of the answer data.

3. The memory according to claim 1, wherein the memory makes available an erase cycle count, a number of reserve blocks still available and/or a remaining lifetime of the memory as part of the diagnostic data.

4. The memory according to claim 1, wherein the evaluation information of the information data set contains interpretation instructions regarding an interpretation of the diagnostic data read out and measures recommended on a part of the memory.

5. The memory according to claim 1, wherein the information data set is stored at a fixedly predefined memory location of the memory.

6. The memory according to claim 1, wherein the information data set contains auxiliary information which, in a case of the memory without readability of the diagnostic data, enables an auxiliary estimation of a lifetime of the memory without the diagnostic data.

7. The memory according to claim 1, wherein the information data set contains description information in human-interpretable text form enabling the diagnostic data supplied by the memory to be interpreted by an operator.

8. The memory according to claim 1, wherein the memory is a nonvolatile flash memory.

9. A method for initializing a memory, which comprises the steps of:

storing an information data set in the memory, the information data set containing:

information about a type of diagnostic data made available by the memory upon external request, the external request allowing an external device access to the diagnostic data;

information about a required request procedure for such external requests, wherein the information about the required request procedure defines at least one bit sequence output by the memory to which the memory reacts by outputting the diagnostic data, and/or defines a request command chain which a device that reads out the information data set can process in order to retrieve the diagnostic data from the memory; and evaluation information enabling an interpretation of answer data supplied by the memory on request.

10. A device, comprising:

an interface for connecting to a memory;

a processor; and an interpretation software module being stored in the device and, upon execution by said processor of the device, causes the device to read out an information data set stored in the memory connected to said interface, said information data set containing information about: a) a type of diagnostic data made available by the memory upon external request, the external request allowing the device access to the diagnostic data, b) information about a required request procedure for such external requests, wherein the information about the required request procedure defines at least one bit sequence output by the memory to which the memory reacts by outputting the diagnostic data, and/or defines a request command chain which a device that reads out the information data set can process in order to retrieve the diagnostic data from the memory and c) evaluation information enabling an interpretation of answer data supplied by the memory on request, and to evaluate the information data set at least with regard to the required request procedure and the interpretation of the answer data.

11. The device according to claim 10, wherein said interpretation software module reads out bit sequences and/or a request command chain from the information data set and subsequently processes same in order to retrieve the diagnostic data from the memory.

12. The device according to claim 10, wherein said interpretation software module reads out interpretation instructions from the information data set and subsequently processes them in order to interpret the diagnostic data read out and to implement measures recommended on a part of the memory.

13. The device according to claim 10, wherein the device visually, haptically and/or acoustically outputs description information of the information data set when requested by an operator and/or enables a remote retrieval of the description information.

14. The device according to claim 10, wherein the device is a power engineering protection and/or observation device for an electrical power supply system.

15. The device according to claim 14, wherein said power engineering protection and/or observation device is selected from the group consisting of a control engineering device, a fault recorder and a unit for monitoring the network quality.

* * * * *